(12) United States Patent
Lee et al.

(10) Patent No.: US 10,521,372 B2
(45) Date of Patent: Dec. 31, 2019

(54) ELECTRONIC DEVICE AND METHOD FOR CONTROLLING SAME

(71) Applicant: Samsung Electronics Co., Ltd., Gyeonggi-do (KR)

(72) Inventors: Woo-Kwang Lee, Gyeonggi-do (KR); Dong-Rak Shin, Gyeonggi-do (KR); Kyoung-Hoon Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/095,404

(22) PCT Filed: Feb. 14, 2017

(86) PCT No.: PCT/KR2017/001596
§ 371 (c)(1),
(2) Date: Oct. 22, 2018

(87) PCT Pub. No.: WO2017/191889
PCT Pub. Date: Nov. 9, 2017

(65) Prior Publication Data
US 2019/0138469 A1    May 9, 2019

(30) Foreign Application Priority Data
May 4, 2016    (KR) .................. 10-2016-0055762

(51) Int. Cl.
*G06F 13/20* (2006.01)
*G06F 13/38* (2006.01)
(Continued)

(52) U.S. Cl.
CPC ............... *G06F 13/20* (2013.01); *G06F 1/16* (2013.01); *G06F 9/445* (2013.01); *G06F 13/38* (2013.01);
(Continued)

(58) Field of Classification Search
CPC ................. G06F 13/20; G06F 13/4282; G06F 2213/0042
See application file for complete search history.

(56) References Cited

U.S. PATENT DOCUMENTS 8,924,598 B1    12/2014   Castleberry et al.
8,996,771 B1    3/2015    Lockwood
(Continued)

FOREIGN PATENT DOCUMENTS

GB           2473123 A         3/2011
KR    10-2014-0099283 A        8/2014
(Continued)

OTHER PUBLICATIONS

European Search Report dated Feb. 19, 2019.

*Primary Examiner* — Henry Tsai
*Assistant Examiner* — John B Roche
(74) *Attorney, Agent, or Firm* — Cha & Reiter, LLC.

(57) ABSTRACT

Electronic devices according to various embodiments of the present invention comprise: a connector for communicating serial data to an external electronic device; a nonvolatile memory; and a processor, wherein the processor is configured to: acquire identification information of the external electronic device via the connector; confirm whether or not a designated mode of the external electronic device is supported at least on the basis of the identification information; based on the identification that the external electronic device supports the designated mode, acquire first additional information associated with the external electronic device; based on the identification that the external electronic device does not support the designated mode, acquire second additional information associated with the external electronic
(Continued)

device; and store the identification information or at least a part of the second additional information in the nonvolatile memory.

20 Claims, 14 Drawing Sheets

(51) Int. Cl.
*G06F 13/40* (2006.01)
*G06F 13/42* (2006.01)
*G06F 1/16* (2006.01)
*G06F 9/445* (2018.01)

(52) U.S. Cl.
CPC .............. *G06F 13/40* (2013.01); *G06F 13/42* (2013.01); *G06F 13/4282* (2013.01); *G06F 2213/0042* (2013.01)

(56) References Cited

U.S. PATENT DOCUMENTS

| | | | |
|---|---|---|---|
| 2011/0010470 A1* | 1/2011 | Hulbert | G06F 3/0219 710/13 |
| 2013/0159559 A1 | 6/2013 | Hess | |
| 2013/0244491 A1 | 9/2013 | Sarwar et al. | |
| 2013/0332632 A1* | 12/2013 | Rathi | H04M 1/72527 710/38 |
| 2014/0156875 A1 | 6/2014 | Saunders et al. | |
| 2015/0138704 A1 | 5/2015 | Thompson et al. | |
| 2015/0261714 A1 | 9/2015 | Talmola | |
| 2015/0269102 A1 | 9/2015 | Inha et al. | |
| 2016/0112711 A1 | 4/2016 | Hundal et al. | |
| 2016/0127770 A1 | 5/2016 | Je et al. | |

FOREIGN PATENT DOCUMENTS

| | | |
|---|---|---|
| KR | 10-2015-0026391 A | 3/2015 |
| WO | 2013/022193 A1 | 2/2013 |

* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | V$_{BUS}$ | CC | D+ | D- | SBU1 | V$_{BUS}$ | RX2- | RX2+ | GND |
| GND | RX1+ | RX1- | V$_{BUS}$ | SBU2 | | | V$_{CONN}$ | V$_{BUS}$ | TX2- | TX2+ | GND |
| B1 | B2 | B3 | B4 | B5 | B6 | B7 | B8 | B9 | B10 | B11 | B12 |

FIG.14

ELECTRONIC DEVICE AND METHOD FOR CONTROLLING SAME

CLAIM OF PRIORITY

This application is a National Phase Entry of PCT International Application No. PCT/KR2017/001596, which was filed on Feb. 14, 2017 and claims priority under 35 U.S.C. § 119 of Korean Patent Application No. 10-2016-0055762, filed on May 4, 2016, in the Korean Intellectual Property Office the disclosure of which is incorporated herein by reference in its entirety.

TECHNICAL FIELD

Various embodiments of the present invention relate to electronic devices, e.g., electronic devices that provide preset functions to accessories connected to the electronic devices and methods for controlling the same.

BACKGROUND ART

Smartphones support various accessories via wired connectors.

Recently, there have been rigorous efforts to adopt accessories using USB type-C connectors.

This trend is expected to accelerate when the EU's regulation enforcing the use of USB type-C is implemented, which will lead to the advent of various accessories and make the compatibility issue a highly critical one.

DETAILED DESCRIPTION OF THE INVENTION

Technical Problem

According to the conventional art, an electronic device undergoes the communication process of using a power delivery (PD) message in the USB type-C alternate mode so that the electronic device will support an accessory if it supports the accessory, but otherwise it will not.

The conventional art only proposes techniques capable of supporting only common devices that operate as defined in the specifications when a USB type-C accessory is connected thereto. The alternate mode only allows accessories supported by the electronic device to operate. Further, the conventional art would not support gathering information about the alternate mode.

The present invention aims to provide an electronic device that provides increased compatibility for various USB accessories and USB type-C connector-supporting devices and supports various kinds of accessories that are not limited in hardware.

Technical Solution

According to various embodiments of the present invention, an electronic device may comprise a connector configured to communicate serial data to an external electronic device, a non-volatile memory, and a processor, wherein the processor may be configured to obtain identification information of the external electronic device through the connector, identify whether the external electronic device supports a designated mode based on, at least, the identification information, based on the identification that the external electronic device supports the designated mode, obtain first additional information related to the external electronic device, and based on the identification that the external electronic device does not support the designated mode, obtain second additional information related to the external electronic device, and store at least part of the identification information or the second additional information in the non-volatile memory.

According to various embodiments of the present invention, a method for controlling an electronic device may comprise obtaining identification information of an external electronic device, identifying whether the external electronic device supports a designated mode based on, at least, the identification information, based on the identification that the external electronic device supports the designated mode, obtaining first additional information related to the external electronic device, and based on the identification that the external electronic device does not support the designated mode, obtaining second additional information related to the external electronic device, and storing at least part of the identification information or the second additional information in a non-volatile memory.

According to various embodiments of the present invention, an electronic device may comprise a connector configured to communicate serial data, a non-volatile memory configured to store first identification information about a first external electronic device previously connected via the connector, and a processor, wherein the processor may be configured to obtain second identification information about a second external electronic device currently connected via the connector, activate at least some functions of the second external electronic device based on, at least, determining that the second identification information corresponds to the first identification information, and deactivate the at least some functions of the second external electronic device based on, at least, determining that the second identification information does not correspond to the first identification information.

According to various embodiments of the present invention, an electronic device may have the operation of storing first identification information about a first external electronic device previously connected with the electronic device, the operation of obtaining second identification information about a second external electronic device currently connected with the electronic device, the operation of activating at least some functions of the second external electronic device based on, at least, determining that the second identification information corresponds to the first identification information, and the operation of deactivating the at least some functions of the second external electronic device based on, at least, determining that the second identification information does not correspond to the first identification information.

Advantageous Effects

According to various embodiments of the present invention, the electronic device may gather information about what kind of accessory is connected to the electronic device so that the user may identify what accessories are frequently used and use the same as marketing information.

Further, the electronic device may gather information about bad USBs or bad alternate devices, and upon doubting that a new accessory is a bad USB, the electronic device may block the accessory from operating.

When a designated mode for the accessory is not supported, the electronic device may receive, from a server, an application (providing a downloadable app fitting the accessory) and a driver (firmware) fitting the RID or EID of the unstructured vendor defined message (VDM), or PID or SVID of the structured VDM.

When EID communication is possible even though the designated mode for the accessory is not supported, the electronic device may perform encrypted communication between the electronic device and the accessory, thereby restricting the functional or operational range of the accessory.

Thus, the user may enjoy as wide a range of compatibility for the accessory as possible.

BRIEF DESCRIPTION OF DRAWINGS

FIG. 14 illustrates at least one resettable pin;

MODE FOR CARRYING OUT THE INVENTION

Figure 1:
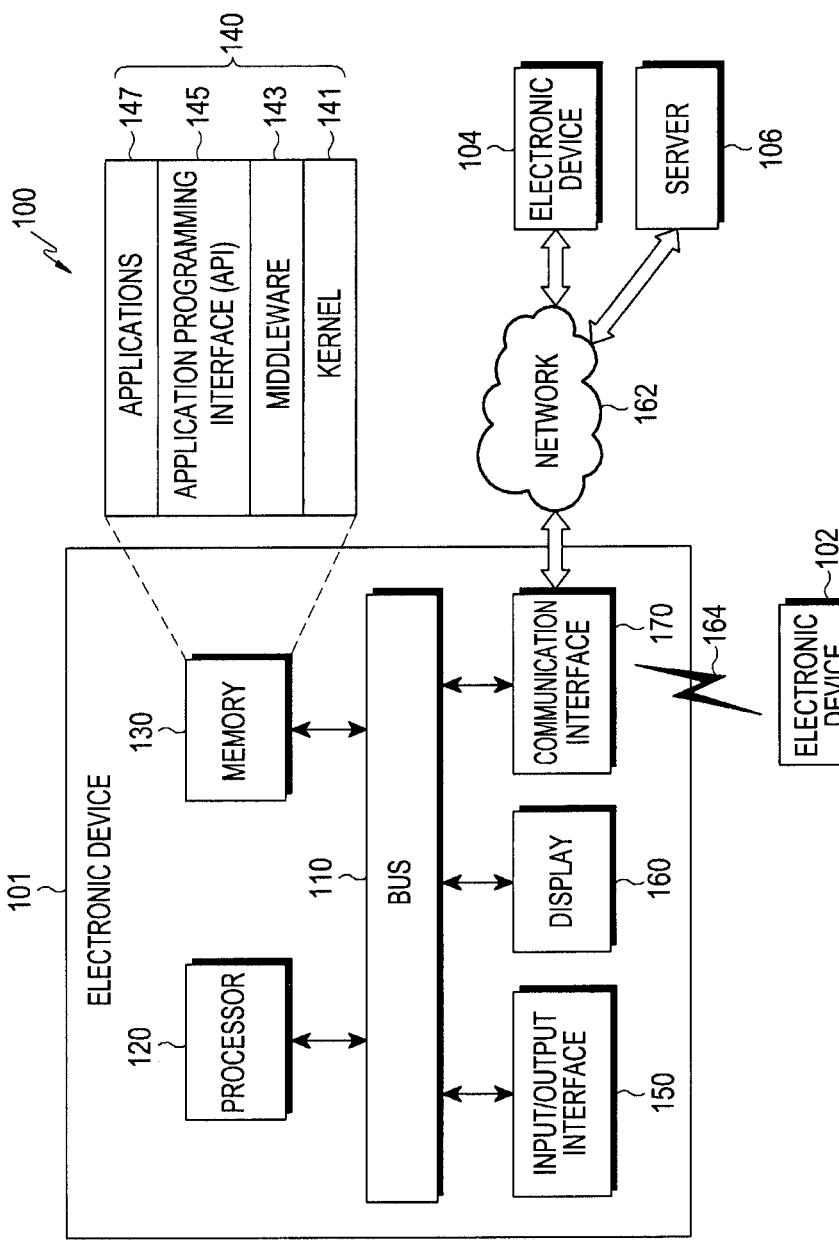
FIG. 1 is a view illustrating a use environment of a plurality of electronic devices according to various embodiments of the present invention.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

In other embodiments, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). As per some embodiments, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to various embodiments, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to various embodiments, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present invention, the wireless communication may include at least one of, e.g., wireless fidelity (Wi-Fi), Bluetooth, Bluetooth low power (BLE), zigbee, near field communication (NFC), magnetic secure transmission (MST), radio frequency, or body area network (BAN). According to an embodiment of the present invention, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to various embodiments, all or some of operations executed on the electronic device 101 may be executed on another or multiple other electronic devices (e.g., the electronic devices 102 and 104 or server 106). According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
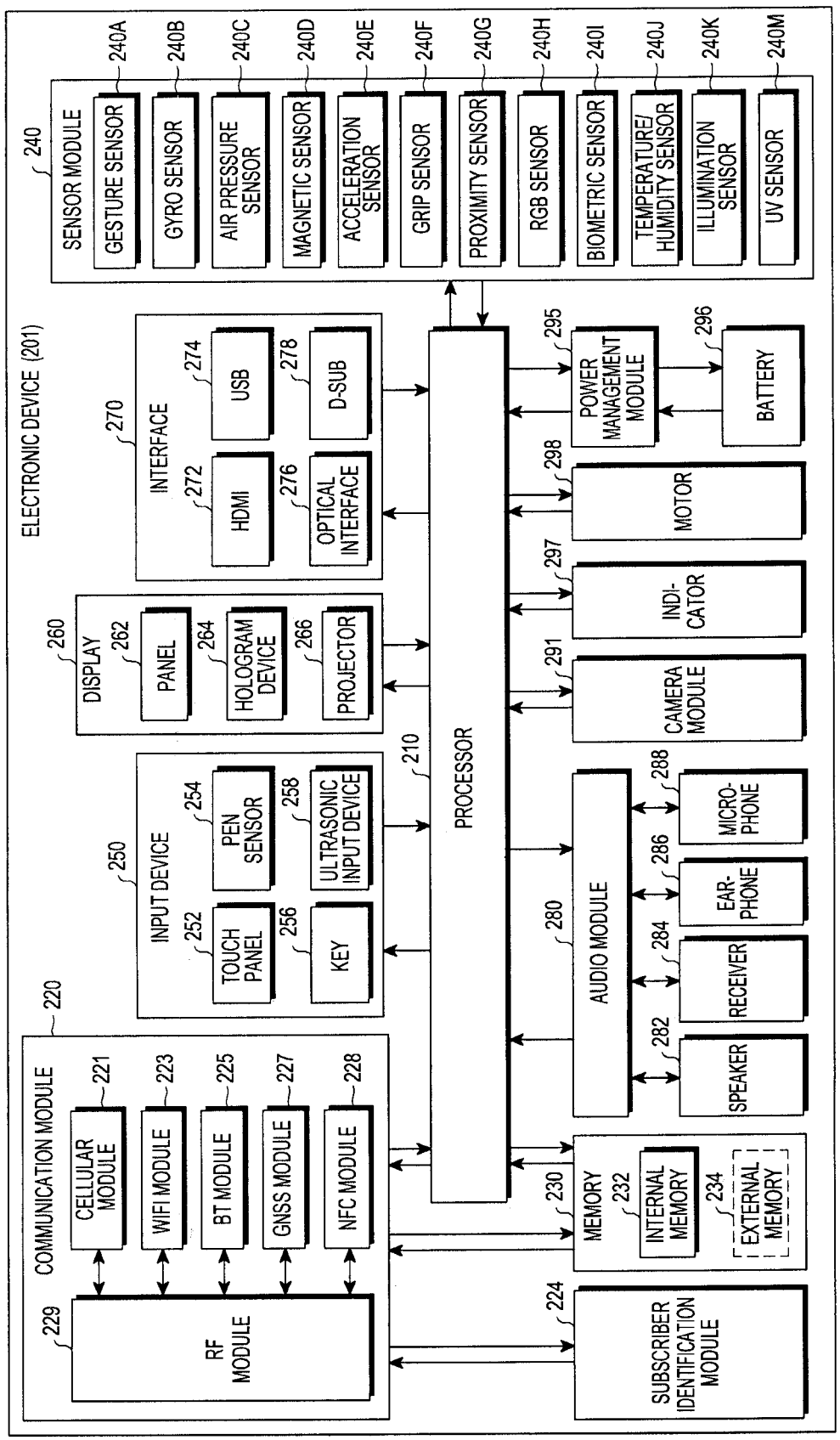
FIG. 2 is a block diagram illustrating an electronic device according to various embodiments of the present invention.

FIG. 2 is a block diagram illustrating an electronic device 201 according to various embodiments. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP). According to an embodiment, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present invention, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, According to an embodiment, one or more image sensors (e.g., front and back sensors), a lens, an image signal processor (ISP), or a flash such as an LED or xenon lamp. The power manager module 295 may manage power of the electronic device 201, for example. According to an embodiment of the present invention, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

Figure 3:
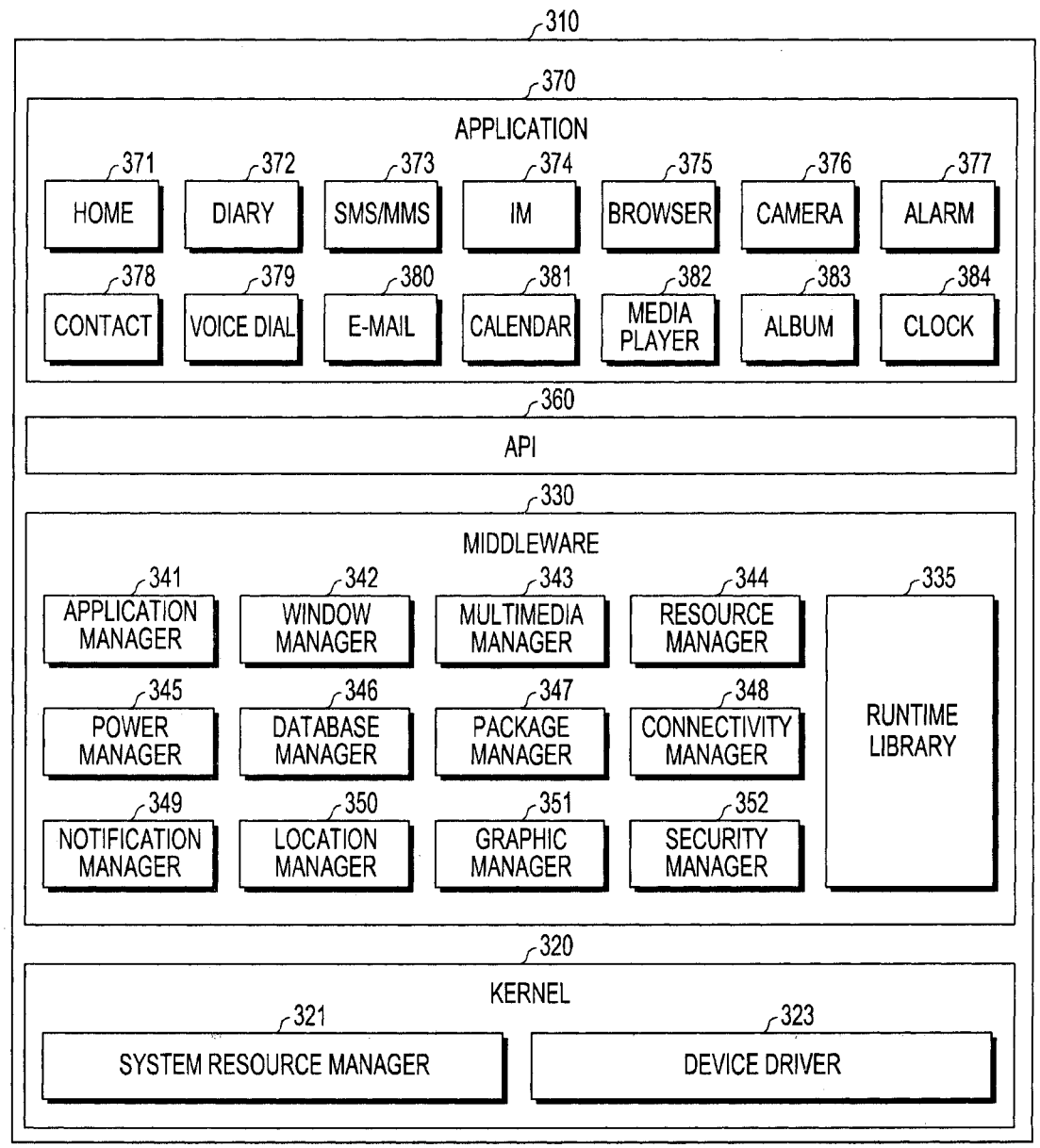
FIG. 3 is a block diagram illustrating a program module according to various embodiments.

FIG. 3 is a block diagram illustrating a program module according to various embodiments. According to an embodiment, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present invention, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present invention, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present invention, the middleware 330 may include a telephony manager for managing the voice or video call function of the electronic device or a middleware module able to form a combination of the functions of the above-described elements. According to an embodiment of the present invention, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a heath-care (e.g., measuring the degree of workout or blood sugar), or provision of environmental information (e.g., provision of air pressure, moisture, or temperature information). According to an embodiment of the present invention, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present invention, the application 370 may include an application (e.g., a healthcare application of a mobile medical device) designated according to an attribute of the external electronic device. According to an embodiment of the present invention, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present invention, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

A method for controlling an electronic device according to various embodiments is described below with reference to FIGS. 4 and 5.

Figure 4:
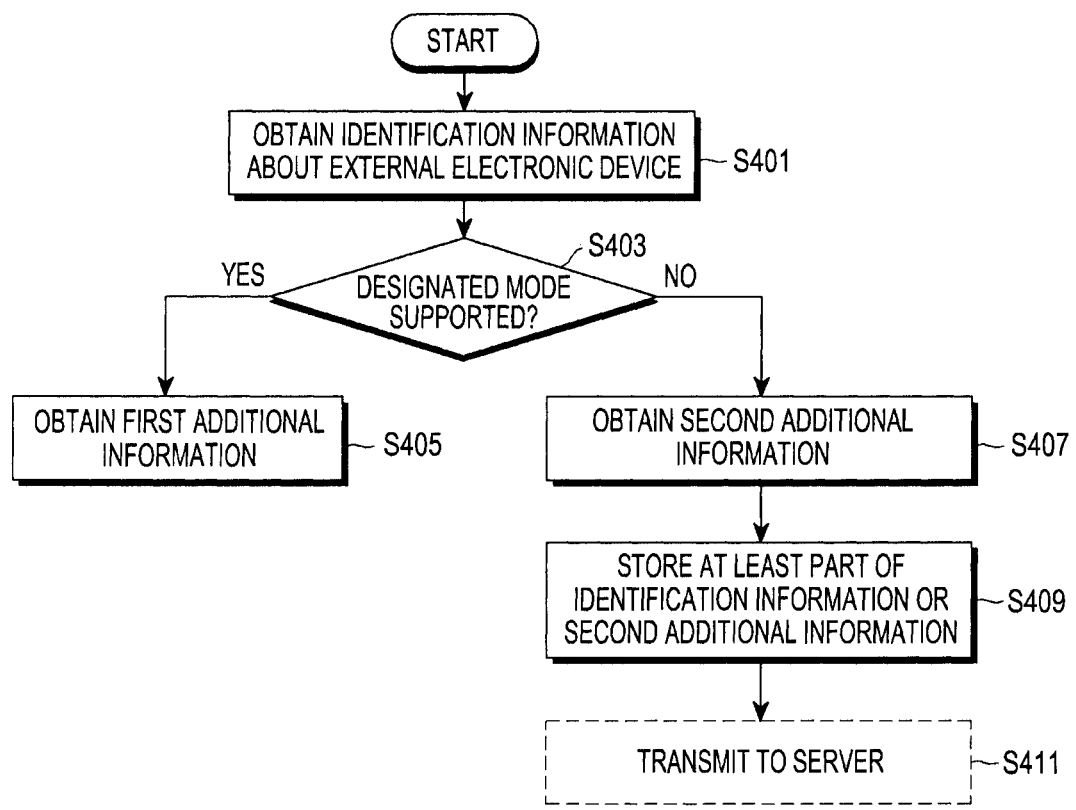
FIG. 4 illustrates a method for controlling an electronic device according to various embodiments.
Figure 5:
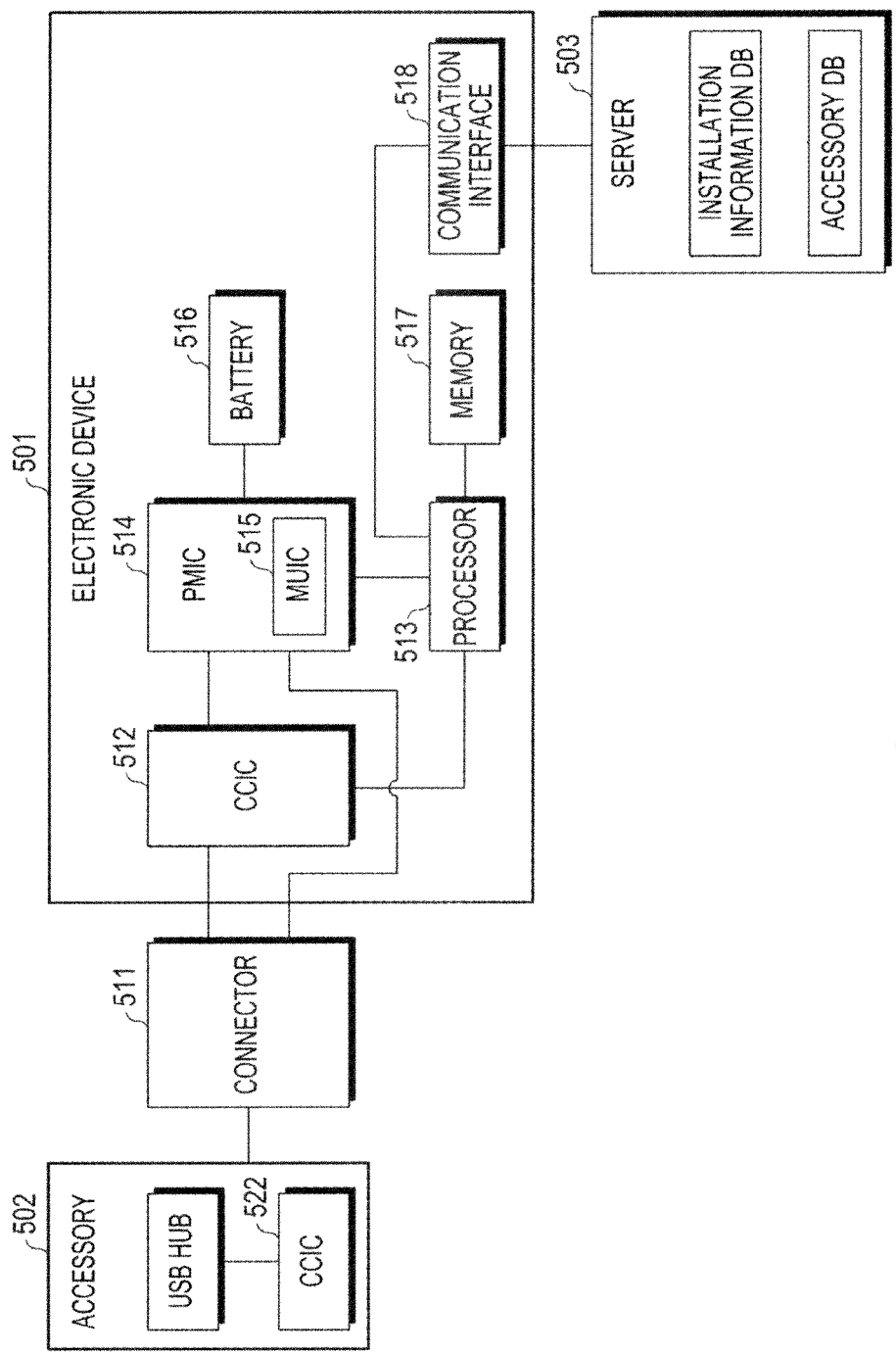
FIG. 5 illustrates an electronic device, an accessory, and a server according to various embodiments.

FIG. 4 illustrates a method for controlling an electronic device according to various embodiments, and FIG. 5 illustrates an electronic device, an accessory, and a server according to various embodiments.

As shown in FIG. 4, according to various embodiments, in operation S401, a processor (e.g., the processor 120) of an electronic device (e.g., the electronic device 101) may obtain the identification information of an external electronic device from the external electronic device.

For example, the identification information may include company information (Vendor ID (VID)), product information (Product ID (PID)), an SVID and/or an EID, and an RID.

For example, the EID may include an electrical marking ID or a product ID. When the manufacturer of the unstructured vendor defined message (VDM) is a particular one (e.g., Samsung Electronics), the EID may include an encrypted product ID for VDM authentication between the electronic device and the unstructured VDM. For example, the VDM may be defined by the standard for the USB power delivery (PD) scheme.

For example, the RID may mean USB 2.0 RID. When the accessory contains the VID of a particular manufacturer (e.g., Samsung Electronics) based on the structured VDM message, the RID may be an ID (e.g., unstructured VDM message) additionally obtainable from a CCIC (identification module) produced by the particular manufacturer (e.g., Samsung Electronics). Further, the RID may allow for identification of the resistance (e.g., ADC) of the ID connected to the CCIC (identification module) produced by the particular manufacturer and may contain accessory information corresponding to the identified resistance. For example, the RID, despite being an ID not supported in the alternate mode, may be an ID used for a dedicated accessory produced by the particular manufacturer or intended for the electronic device produced by the particular manufacturer.

For example, as shown in FIG. 5, an accessory 502 may be an example of the external electronic device. For example, the electronic device 501 may connect to the accessory 501 via the USB data pin and the CC pin of the connector 511 of the electronic device. For example, the connector 511 of the electronic device may have a shape corresponding to USB type-C. For example, the electronic device 501 may include a CCIC (identification module) 512. For example, the CCIC 512 may obtain identification information of the accessory 502 via the connector 511 and transmit the obtained identification information of the accessory 502 to the PMIC 514 and/or the processor 513.

For example, the electronic device 501 may include a type-C cable 511, a configuration channel IC (CCIC) 512, an MUIC 515, a PMIC 514, an AP (e.g., the processor 513), a memory 517, and/or a communication interface 518.

According to various embodiments, the CCIC 512 may be connected to the CC terminal of the connector 511. For example, if the accessory 502 connects to the connector 511, the CCIC 512 may perform CC communication with the CCIC 522 of the accessory 502 as per the method specified in USB type C. For example, the CCIC 512 may transmit and/or receive a USB power delivery (PD) message to/from the CCIC 512. According to various embodiments, the CCIC 512 may transmit identification information of the accessory 502, such as the SVID and/or PID, from the CCIC 522 to the processor 513.

Although FIG. 5 illustrates that the CCIC 512 is configured separately from the PMIC 514 and the MUIC 515, according to various embodiments, the MUIC 515 may be configured inside the CCIC 512, or the PMIC 514, the MUIC 515, and/or the CCIC 512 may be configured in a single module.

According to various embodiments, the micro USB switch IC (MUIC) 515 may control a USB signal path and deliver BUS voltage. According to various embodiments, the electronic device 501 may transmit and/or receive a billboard descriptor to/from the accessory 502 via a USB 2.0 line, in which case the MUIC 515 may switch to a D+ line and/or a D− line. For example, the MUIC 515 may be provided inside the PMIC 514, and in contrast to what is illustrated in FIG. 5, the MUIC 515 may be provided inside the electronic device 501 and separately from the PMIC 514. For example, the MUIC 515 may include a non-volatile memory.

According to various embodiments, the PMIC (power management IC) 514 may control the supply of power to the electronic device 501 and/or the accessory 502. For example, the PMIC 514 may control the battery 516 to stably supply power from the accessory 502 and the battery 516 of the electronic device 501 to internal parts of the electronic device 501 and/or the accessory 502. For example, if the accessory 502 is connected, the PMIC 514 may allow the battery 516 to be charged with power and may deliver power from the inside of the electronic device 501 to the accessory 502. For example, the PMIC 514 may be provided as one or more components in the electronic device 501.

According to various embodiments, the processor 513 may process USB billboard descriptor information. According to various embodiments, the processor 513 may perform a control to store information of one or more accessories 502 connected via the connector 511 in the memory 517 and to transfer the information to a preset server 503. For example, the processor 513 may include a USB host controller, drive a USB protocol using the USB host controller, and perform USB communication using the driven USB protocol. For example, the processor 513 may be an AP (e.g., the AP 310). For example, the non-volatile memory may be part of the memory 517 which is controlled by the AP 310.

According to various embodiments, the memory 517 may store identification information of the accessories 502 connected via the connector 511 and/or additional information of the accessories 502.

According to various embodiments, the communication interface 518 may deliver the identification information and/or additional information of the accessories 502 to the preset external server 503.

For example, the electronic device 501 and the accessory 502 may perform PD communication, which adopts a bi-phase marked coding (BMC) scheme, via the connector 511.

According to various embodiments, in operation S403, the processor (e.g., the processor 513) may identify whether the external electronic device (e.g., the accessory 502) supports a designated mode based on, at least, the obtained identification information. For example, the designated mode may be the alternate mode.

According to various embodiments, in operation S405, when the external electronic device 502 supports the designated mode, the processor 513 may obtain first additional information related to the external electronic device 502.

For example, the first additional information may include a PID for the accessory 502.

According to various embodiments, in operation S407, unless the external electronic device 502 supports the designated mode, the processor 513 may obtain second additional information related to the external electronic device 502.

For example, the second additional information may include a VID, a PID, URL information related to the accessory 502, string information, and/or information about a power support list.

According to various embodiments, in operation S409, the processor 513 may store at least part of the obtained identification information and/or the second additional information in the non-volatile memory (e.g., the memory 517).

For example, the processor 513 may identify the VID, and when the identified VID contains product information (e.g., Samsung Electronics) of a particular company, the processor 513 may provide all of the functions for the accessory that sent the VID. For example, unless the identified VID contains the product information of the particular company, the processor 513 may provide only some of the functions for the accessory which sent the VID.

For example, the processor 513 may transmit the VID, PID, and/or EID information to the server 503 via the communication interface 518, send a request for an installation application, an installation link, and/or an installation driver for the accessory 502 to the server 503, and receive the installation application, installation link, and installation driver from the server 503.

For example, the processor 513 may identify whether the accessory 502 is a defective USB (bad USB) based on at least part of the identification information, the first additional information, and/or the second additional information.

For example, upon identifying that the accessory 502 is a bad USB, the processor 502 may be configured to switch off at least some terminals (e.g., resettable terminals) of the connector 511, vary the settings of the CCIC 512 to block signals received from the accessory 502, or not to process serial data obtained via the pins connecting the accessory 502, and the processor 502 may output information indicating that the accessory 502 is a bad USB through a display (e.g., the display 160) or transmit the information to the server 503.

For example, the processor 502 may provide a power transmission/reception function identified based on the obtained second additional information to the accessory 502.

According to various embodiments, the processor 502 may store first identification information about a first accessory previously connected via the connector 511 in the memory 517, obtain second identification information about a second accessory connected via the connector 511, and activate at least some functions of the second accessory based on, at least, the determination that the second identification information corresponds to the first identification information.

According to various embodiments, the processor 502 may deactivate at least some functions of the second accessory based on, at least, the determination that the second identification information does not correspond to the first identification information.

According to various embodiments, in operation S411, the processor 502 may transmit at least part of the stored identification information or second additional information to the server.

For example, the processor 502 may receive, from the server, an application corresponding to the at least part of the second additional information or identification information about the external electronic device, execute the received application, and support the designated mode for the external electronic device determined to not support the designated mode using the executed application.

Figure 6:
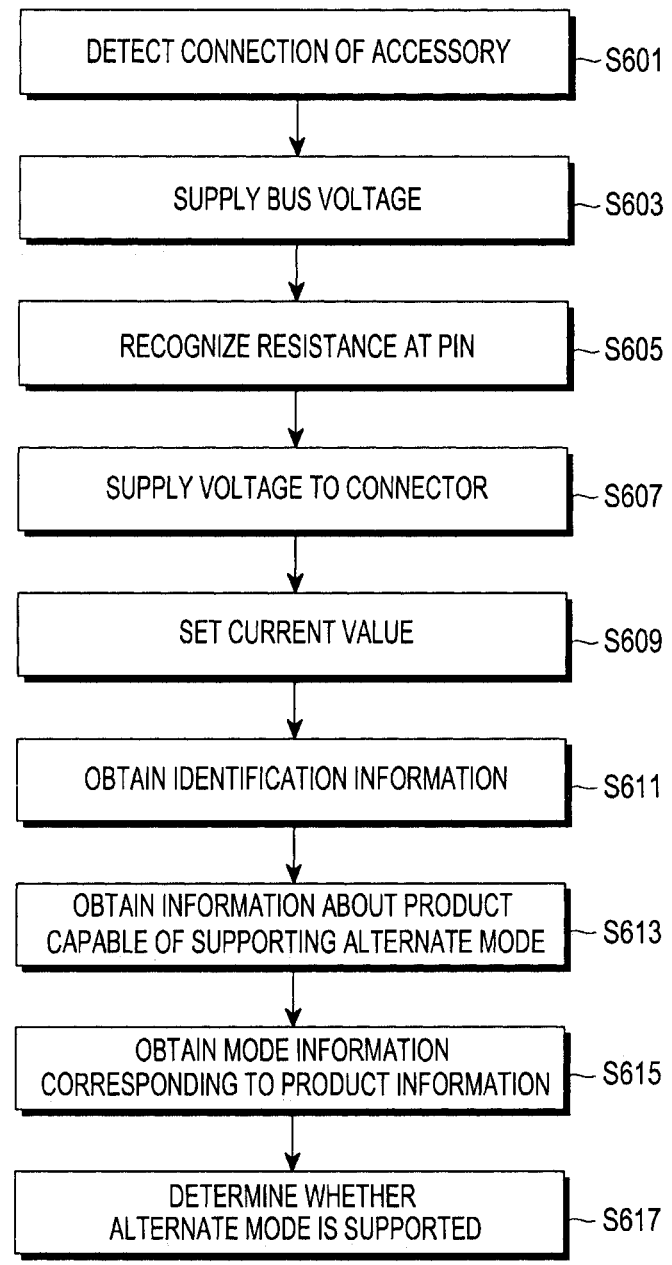
FIG. 6 illustrates a method for controlling an electronic device as per a designated mode (alternate mode) according to various embodiments.

FIG. 6 illustrates a method for controlling an electronic device as per a designated mode (alternate mode) according to various embodiments.

As shown in FIG. 6, according to various embodiments, in operation S601, an electronic device (e.g., the electronic device 501) may detect the connection of an accessory (e.g., the accessory 502).

According to various embodiments, in operation S603, the electronic device 501 may supply a BUS voltage (Vbus) to the accessory 502.

According to various embodiments, in operation S605, upon recognizing an Ra resistance at the CC pin, the electronic device 501 may, in operation S607, supply voltage (Vconn) to the connector (e.g., the connector 511) including the CC pin.

According to various embodiments, in operation S609, the electronic device 501 my transmit or receive a USB PD message, and corresponding thereto, may receive information (e.g., current information and/or voltage information) about the power available to the accessory 502 from the accessory 502, and the electronic device 501 may set the current value to be provided to the accessory 502 based on the information about the available power.

According to various embodiments, in operation S611, the electronic device 501 may obtain identification information about the accessory 502 from the accessory 502.

According to various embodiments, in operation S613, the electronic device 501 may obtain produce information (PID) that is able to support the alternate mode (designated mode) and/or vendor information (VID) that corresponds to the produce information (PID) from the accessory 502.

Figure 11:
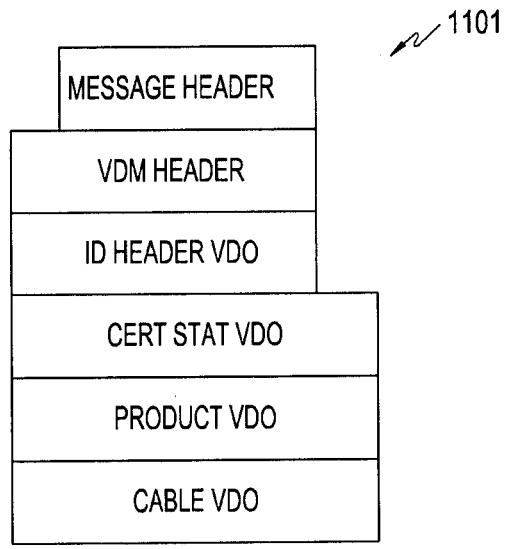
FIG. 11 illustrates a packet data structure of a VID and/or a PID according to various embodiments.

FIG. 11 illustrates the packet data structure of a VID and/or a PID according to various embodiments.

As shown in FIG. 11, the packet data structure 1101 of a VID and/or a PID may include a message header, a VDM header, an ID header vendor defined object (VDO), a cert stat VDO, a product VDO, and cable VDO information. For example, the VDO may be an example of a 32-bit message outlined in the standard transmission scheme corresponding to power delivery (power delivery scheme). For example, the ID header VDO may include USB vendor ID information (e.g., Samsung Electronics). For example, the product ID may include USB product ID information (0x1012). For example, the VDM header may be the header of a message preset (or pre-defined) by a particular manufacturer, and the ID header VDO may include an identification information (ID) list.

Referring back to FIG. 6, according to various embodiments, in operation S615, the electronic device 501 may send, to the accessory 502, a request for, and/or obtain, designated mode (alternate mode) information corresponding to the obtained product information (PID).

Figure 12:
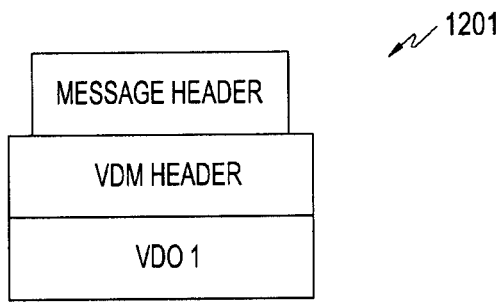
FIG. 12 illustrates a packet data structure of designated mode information corresponding to product information according to various embodiments.

FIG. 12 illustrates a packet data structure for information about the list of products corresponding to a designated mode according to various embodiments.

As shown in FIG. 12, the electronic device 501 may obtain, from the accessory 502, and identify list information about products corresponding to a designated mode. For example, the packet data structure 1201 of the list information about the products corresponding to the designated mode may include a message header, a VDM header, and/or a VDO 1 for information about products capable of supporting the mode. For example, the VDM header may be the header of a message preset (or pre-defined) by a particular manufacturer, and VDO 1 may include at least some VDOs among the VDOs of the products corresponding to the designated mode.

Turning back to FIG. 6, according to various embodiments, in operation S617, the electronic device 501 may determine whether the accessory 502 supports the designated mode (alternate mode).

Figure 13:
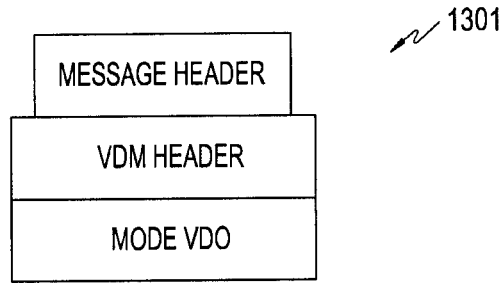
FIG. 13 illustrates a packet data structure of mode supporting information according to various embodiments.

FIG. 13 illustrates a packet data structure of the mode supporting information according to various embodiments.

For example, as shown in FIG. 13, the packet data structure 1301 of list information about a supportable mode may include a message header, a VDM header, and/or a mode VDO. For example, the VDM header may be the header of a message preset (or pre-defined) by a particular manufacturer, and the mode VDO may include at least some of VDOs of the supportable mode.

Returning to FIG. 6, according to various embodiments, upon determining that the accessory 502 supports the designated mode (alternate mode), the electronic device 501 may reset at least some pin (e.g., 13) of pins (e.g., 24) of the connector 511 connected with the accessory 502.

FIG. 14 illustrates at least one resettable pin.

As shown in FIG. 14, for example, examples of resettable pins among at least one pin 1401 may include an A11 ("RX2−") pin, an A10 ("RX2−") pin, an A8 ("SBU1") pin, an A4 ("VBUS") pin, an A3 ("TX1−") pin, an A2 ("TX1+1") pin, a BW ("TX2+2") pin, a B3 ("TX2−") pin, a B5 ("VCONN") pin, a B6, B7, and B8 ("SBU2") pin, a B10 ("RX−") pin, and a B11 ("RX1+") pin.

For example, examples of accessory modes providable by the electronic device 501 using the resettable pins, as per the alternate mode, may include display port (DP), MHL, USB display, USB host, USB device, PCIe, ethernet, audio, and PD charger.

Referring back to FIG. 6, according to various embodiments, upon determining that the accessory 502 does not support the alternate mode, USB bus enumeration may be carried out, and the electronic device 501 may enter a USB billboard device interface (device class interface) providing mode through a USB2.0 line (D+, D−).

According to various embodiments, the electronic device 501 may obtain URL information about an additional description, the PID, the VID of the accessory, and the accessory name (device name) by using a device descriptor and billboard capability descriptor for information about the failure to enter the alternate mode.

Figure 15:
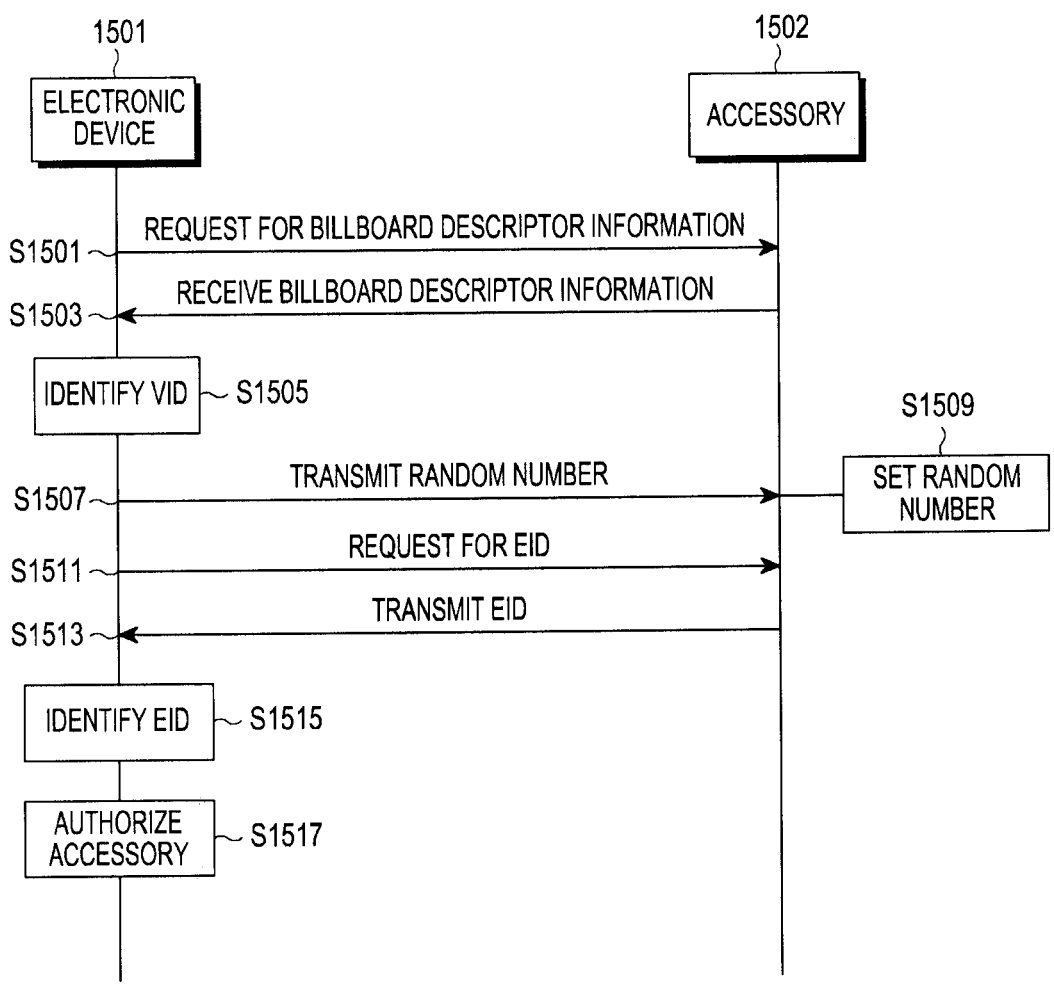
FIG. 15 illustrates a procedure for obtaining a VID and an EID from an accessory where the accessory does not support the alternate mode according to various embodiments.

FIG. 15 illustrates a procedure for obtaining a VID and an EID from an accessory when the accessory does not support the alternate mode according to various embodiments.

As shown in FIG. 15, according to various embodiments, in operation S1501, upon determining that an accessory does not support the alternate mode, an electronic device 1501 may send a request for a billboard descriptor to the accessory 1502.

According to various embodiments, in operation S1503, the electronic device 1501 may receive a billboard descriptor from the accessory 1502, corresponding to the billboard descriptor request.

According to various embodiments, in operation S1505, the electronic device 1501 may identify accessory-related information (e.g., information regarding the manufacturer of the accessory, the product name of the accessory, or product information about the accessory) VID about the connected accessory based on the received billboard descriptor. For example, the electronic device 1501 may identify whether the accessory 1502 is a product from a particular vendor by using the received VID.

According to various embodiments, in operation S1507, the electronic device 1501 may generate a random number based on the result of the identification and transmit the random number to the accessory 1502.

According to various embodiments, in operation S1509, the accessory 1502 may store the received random number.

According to various embodiments, the electronic device 1501 may send a request for an EID to the accessory 1502. The EID may include an electrical marking ID or a product ID. When the manufacturer of the unstructured VDM is a particular one (e.g., Samsung Electronics), the EID may include an encrypted product ID for VDM authentication between the electronic device and the unstructured VDM.

According to various embodiments, in operation S1511, the electronic device 1501 may send a request for an EID to the accessory 1502, and in operation S1513, the electronic device 1501 may receive an EID from the accessory 1502.

According to various embodiments, in operation S1515, the electronic device 1601 may identify the EID. For example, the electronic device 1601 may determine whether the received EID is an EID from a particular vendor (e.g., Samsung Electronics).

According to various embodiments, in operation S1517, upon determining that the received EID is an EID from the particular vendor, the electronic device 1501 may authorize connection of the accessory 1502.

Figure 16:
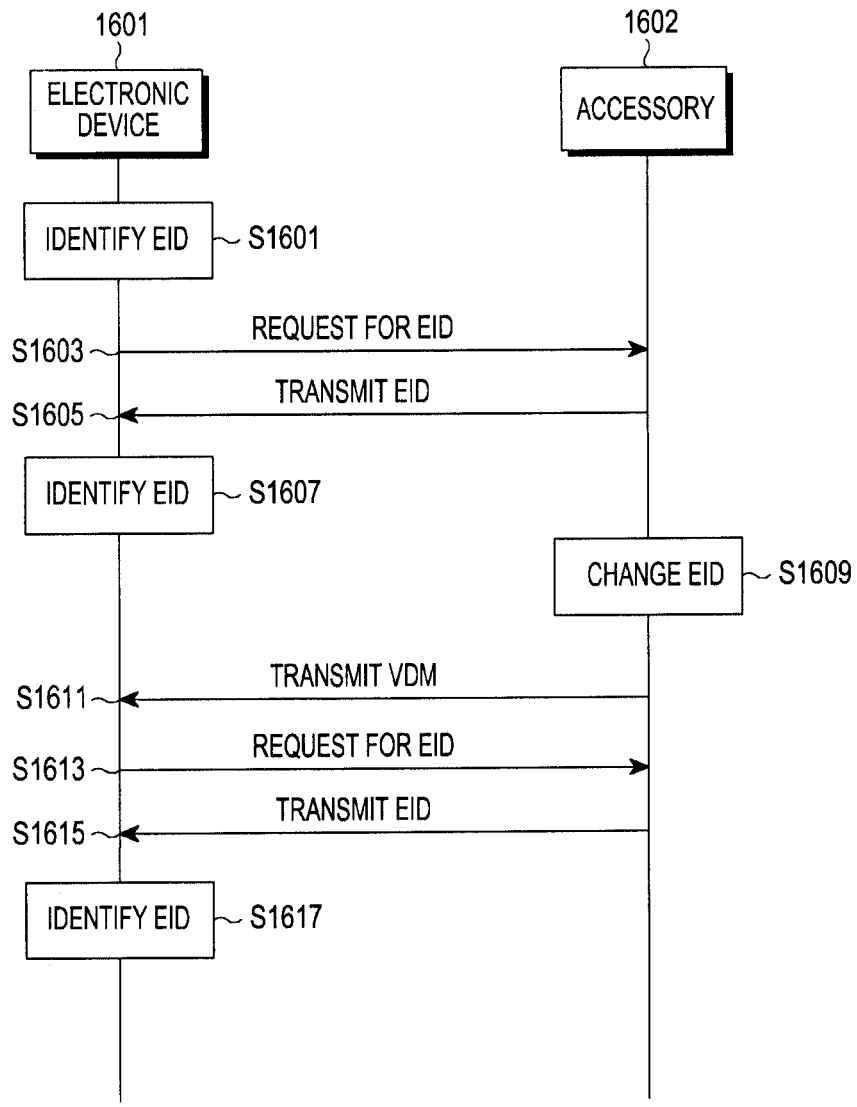
FIG. 16 illustrates an RID transmission/reception procedure according to various embodiments.

FIG. 16 illustrates an EID transmission/reception procedure according to various embodiments.

For example, the EID may include an electrical marking ID or a product ID. When the manufacturer of the unstructured VDM is a particular one (e.g., Samsung Electronics), the EID may include an encrypted product ID for VDM authentication between the electronic device and the unstructured VDM.

As shown in FIG. 16, according to various embodiments, in operation S1601, an electronic device 1601 may identify whether the received EID is an EID from a particular vendor.

For example, the electronic device 1601 may identify that the received EID is not an EID that encrypts information about an accessory of the particular vendor but instead an EID that encrypts information about a factory cable.

According to various embodiments, in operation S1603, upon identifying that the received EID is not an EID encrypting the information about the accessory of the particular vendor but an EID encrypting the information about the factory cable, the electronic device 1601 may send a request for an EID to an accessory 1602. For example, the EID may be a PD message containing information about connector resistance additionally obtainable from the CCIC produced by the particular vendor.

According to various embodiments, in operation S1605, the electronic device 1601 may receive an EID from the accessory 1602, and in operation S1607, the electronic device 1601 may determine whether the received EID is a VID of the particular vendor.

According to various embodiments, when the resistance of the EID connector changes to an unstructured VDM in operation S1609, the electronic device 1601 may, in operation S1611, receive an unstructured VDM of the changed resistance from the accessory 1602.

According to various embodiments, in operation S1613, the electronic device 1601 may send a request for an unstructured VDMEID to the accessory 1602, and in operation S1615, the electronic device 1601 may receive an unstructured VDM from the accessory 1702.

Figure 7:
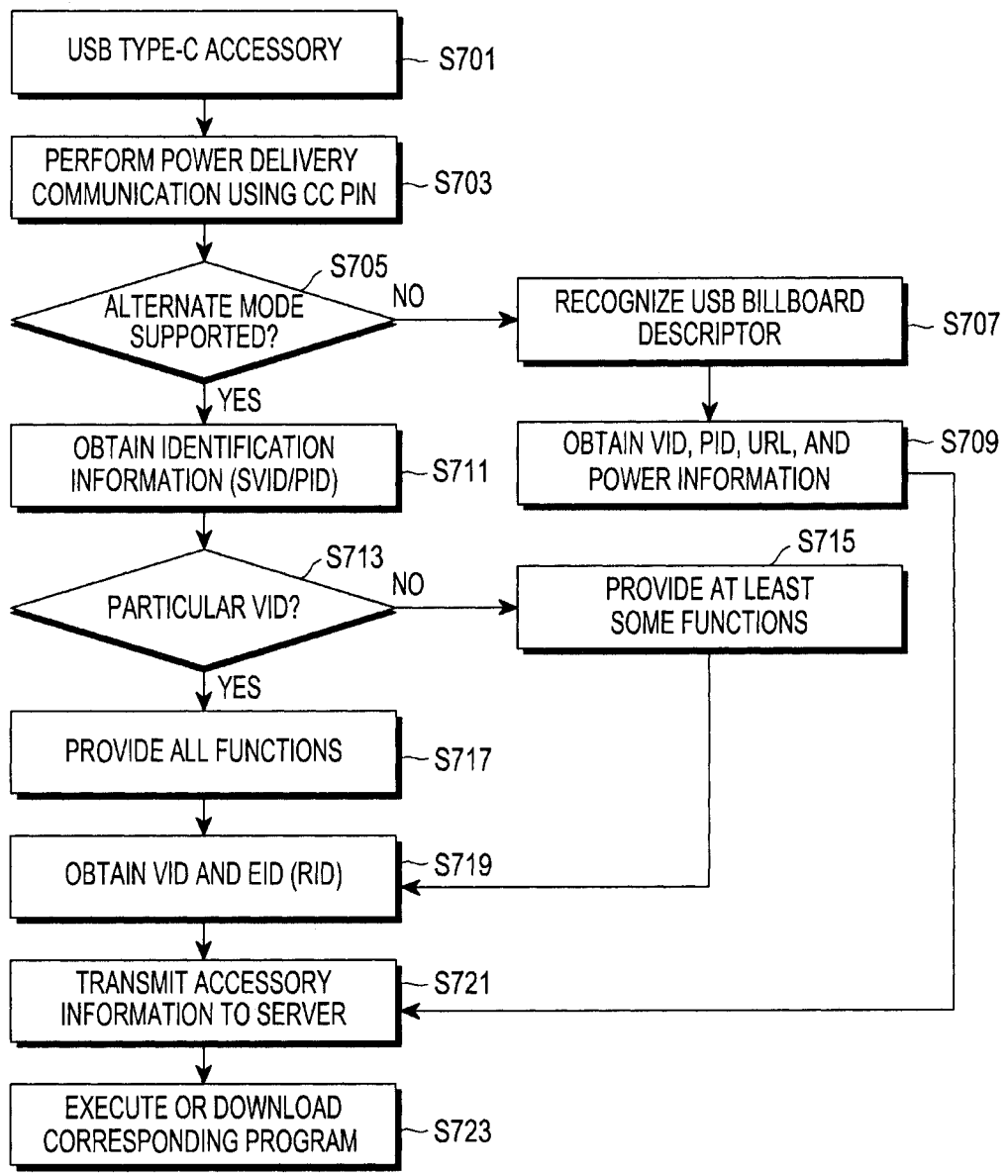
FIG. 7 illustrates a method for controlling an electronic device according to various embodiments.

FIG. 7 illustrates a method for controlling an electronic device according to various embodiments.

As shown in FIG. 7, according to various embodiments, in operation S701, a processor (e.g., the processor 120) may determine that a USB type-C accessory is connected.

According to various embodiments, in operation S703, the processor 120 may perform power delivery (PD) communication with the USB type-C accessory by using the CC pin.

According to various embodiments, in operation S705, the processor 120 may determine whether the USB type-C accessory supports the alternate mode.

According to various embodiments, in operation S707, upon determining that the USB type-C accessory does not support the alternate mode, the processor 120 may recognize a USB billboard descriptor.

According to various embodiments, in operation S709, the processor 120 may obtain the VID, PID, URL, and/or power information about the USB type-C accessory.

According to various embodiments, in operation S711, upon determining that the USB type-C accessory supports the alternate mode, the processor 120 may obtain identification information (e.g., SVID or PID) about the USB type-C accessory.

According to various embodiments, in operation S713, the processor 120 may determine whether the VID of the USB type-C accessory is a VID of a particular vendor (e.g., Samsung Electronics) based on the obtained identification information.

According to various embodiments, in operation S715, when the VID of the USB type-C accessory is not a VID of the particular vendor (e.g., Samsung Electronics), the processor 120 may provide at least some—but not all—of the functions for the accessory connected to the electronic device for the USB type-C accessory.

According to various embodiments, in operation S717, when the VID of the USB type-C accessory is a VID of the particular vendor (e.g., Samsung Electronics), the processor 120 may provide all of the functions for the accessory connected to the electronic device for the USB type-C accessory.

According to various embodiments, in operation S719, the processor 120 may obtain the VID or EID (e.g., RID) of the USB type-C accessory.

According to various embodiments, in operation S721, the processor 120 may transmit accessory information (e.g., identification information, VID, EID, or RID) of the USB type-C accessory to an external server.

According to various embodiments, in operation S721, the processor 120 may execute a function (e.g., an application or driver) corresponding to the accessory information (e.g., identification information, VID, EID, or RID) of the USB type-C accessory. According to various embodiments, in operation S721, the processor 120 may download a program (application or driver) of the function corresponding to the USB type-C accessory from the external server or may execute a downloaded function (e.g., application or driver).

Figure 8:
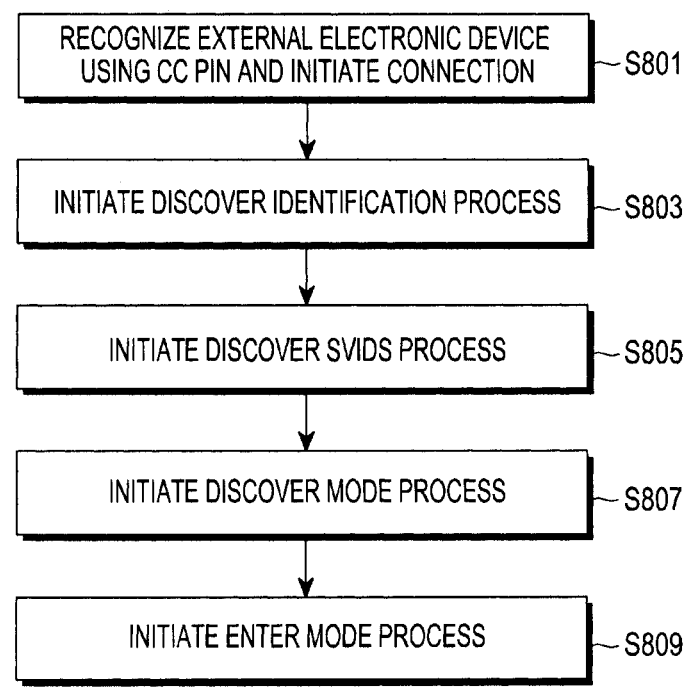
FIG. 8 illustrates a method for initiating a process by a processor according to various embodiments.

FIG. 8 illustrates a method for initiating a process by a processor according to various embodiments.

As shown in FIG. 8, according to various embodiments, in operation S801, a processor (e.g., the processor 120) may recognize an external electronic device (e.g., a USB type-C accessory) using a CC pin and initiate a connection with the external electronic device.

According to various embodiments, in operation S803, the processor 120 may initiate a discover identification process for the external electronic device.

According to various embodiments, in operation S805, the processor 120 may initiate a procedure for obtaining discover SVIDs for the external electronic device, i.e., the SVID of the external electronic device.

According to various embodiments, in operation S805, the processor 120 may, as the discover SVIDs procedure, differentiate at least some information about SVIDs for which obtaining has succeeded and at least some information about SVIDs for which obtaining has failed, store in the memory 517 of the electronic device, or transfer to the server 503, at least some of the information. According to various embodiments, in operation S807, the processor 120 may initiate a discover mode process for the external electronic device.

According to various embodiments, in operation S809, the processor 120 may initiate an enter mode process.

For example, the enter mode may mean a mode that the processor 120 uses to enter a particular mode (e.g., the alternate mode) of the accessory and/or a mode in which the processor 120 may use a command to enter the particular mode. For example, the entry into the enter mode or a method for performing a process in the enter mode (e.g., an alternate mode entry method) may be previously set by the manufacturer of the electronic device 501 and/or the accessory.

Figure 9:
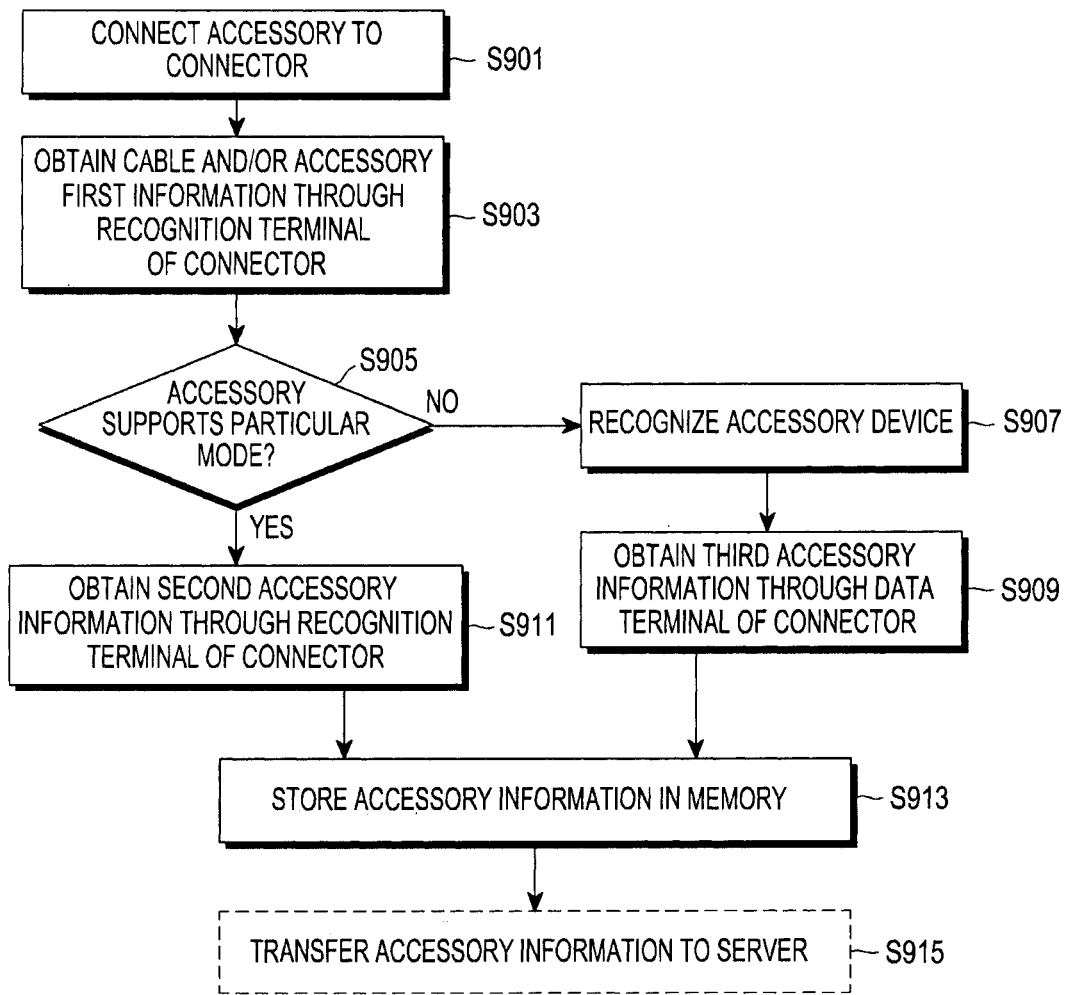
FIG. 9 illustrates a method for connecting an accessory according to various embodiments.

FIG. 9 illustrates a method for connecting an accessory according to various embodiments.

As shown in FIG. 9, according to various embodiments, in operation S901, a processor (e.g., the processor 120) may detect the connection of an accessory (e.g., an external electronic device) to a connector.

According to various embodiments, in operation S903, the processor 120 may obtain first information about an accessory and/or cable connected via a recognition terminal of the connector.

For example, the first information may contain information that makes it possible to identify whether the accessory may support a particular mode (e.g., the alternate mode).

According to various embodiments, in operation S905, the processor 120 may determine whether the accessory supports the particular mode based on the obtained first information. For example, the processor 120 may determine whether mode-related information related to the mode of the accessory can be obtained through the recognition terminal of the connector, and upon determining that the mode-related information is obtainable, the processor 120 may obtain the mode-related information and determine whether the accessory supports the particular mode.

According to various embodiments, in operation S907, when the accessory does not support the particular mode or upon determining that the mode-related information related to the mode of the accessory is not obtainable through the recognition terminal of the connector, the processor 120 may recognize the accessory device, and the processor 120 may, in operation S909, obtain third information about the accessory from the accessory through the data terminal of the connector. For example, the third information may include additional information, such as power information, or the URL, PID, or VID for the accessory.

According to various embodiments, in operation S911, when the accessory supports the particular mode (e.g., the alternate mode) or when the mode-related information related to the mode of the accessory is obtainable through the recognition terminal of the connector, the processor 120 may obtain second information about the accessory from the accessory through the recognition terminal of the connector. For example, the second information may include identification information (e.g., SVID, PID, VID, EID, or RID) about the accessory.

According to various embodiments, in operation S913, the processor 120 may store the first information, second information, and/or third information about the accessory in a memory (e.g., the memory 130), and the processor 120 may, in operation S915, transfer the stored accessory information to a server. For example, the processor 120 may download, from the server, an application for connecting the accessory and execute the application.

Figure 10:
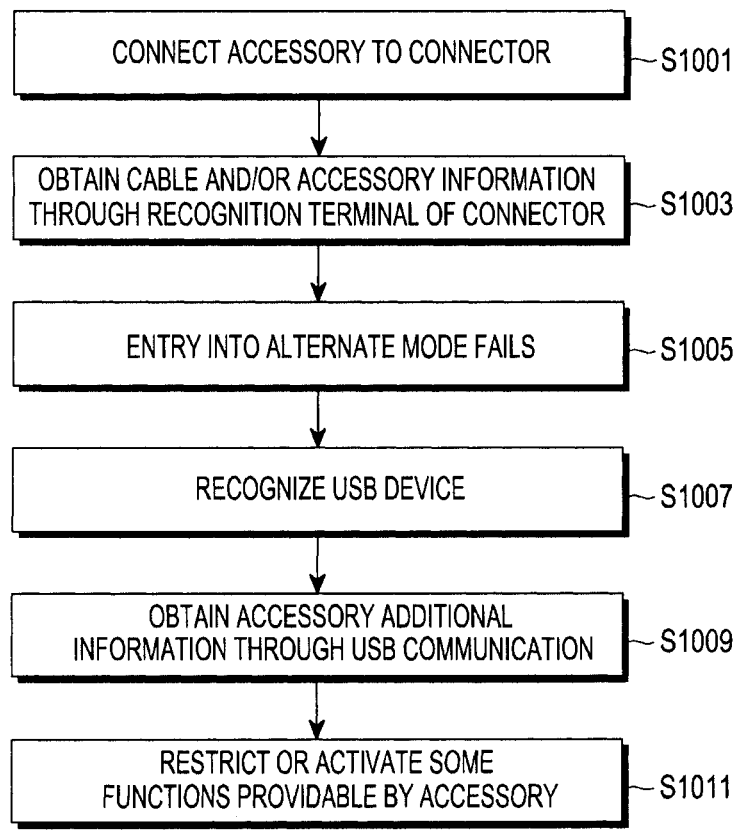
FIG. 10 illustrates a method for recognizing an accessory according to various embodiments.

FIG. 10 illustrates a method for recognizing an accessory according to various embodiments.

As shown in FIG. 10, according to various embodiments, in operation S1001, a processor (e.g., the processor 120) may detect the connection of an accessory to a connector, and the processor 120 may, in operation S1003, obtain cable and/or accessory information through the recognition terminal of the connector.

According to various embodiments, the processor 120 may determine whether the accessory supports the alternate mode based on the accessory information, and the processor 120 may, in operation S1005, determine a failure to enter the alternate mode.

According to various embodiments, in operation S1007, the processor 120 may recognize a USB (e.g., accessory) device, and the processor 120 may, in operation S1009, obtain additional accessory information about the accessory by using USB communication.

According to various embodiments, in operation S1011, the processor 120 may limit or activate some functions providable to the accessory based on the additional accessory information and/or information about the accessory and may provide the functions to the accessory (e.g., a USB).

According to various embodiments, an electronic device may comprise a connector configured to communicate serial data with an external electronic device, a non-volatile memory, and a processor, wherein the processor may be configured to obtain identification information of the external electronic device through the connector, identify whether the external electronic device supports a designated mode based on, at least, the identification information, when the external electronic device supports the designated mode, obtain first additional information related to the external electronic device, and when the external electronic device does not support the designated mode, obtain second additional information related to the external electronic device, and store at least part of the identification information or the second additional information in the non-volatile memory.

According to various embodiments, the electronic device may further comprise an identification module configured to identify the external electronic device, and the non-volatile memory may be configured as at least part of the identification module.

According to various embodiments, the processor may include an application processor, and the non-volatile memory may be configured as at least part of a memory controlled by the application processor.

According to various embodiments, the electronic device may further comprise an identification module configured to identify the external electronic device, and the identification module may be configured to transfer at least part of the identification information or the second additional information from the non-volatile memory constituting at least part of the identification module to the non-volatile memory.

According to various embodiments, the electronic device may further comprise a communication interface, and based on the identification that the designated mode is not supported, the processor may be configured to transmit at least part of the identification information or the second additional information to another external electronic device by using the communication interface.

According to various embodiments, the processor may be configured to obtain installation information corresponding to the external electronic device from the other external electronic device by using the communication interface in response to the transmission.

According to various embodiments, the connector may include at least one pin for communicating with the external electronic device. The processor may be configured to, based on the identification that the designated mode is not supported, abstain from processing the serial data obtained through the pin based on the second additional information.

According to various embodiments, a method for controlling an electronic device may comprise obtaining identification information of an external electronic device, identifying whether the external electronic device supports a designated mode based on, at least, the identification information, based on the identification that the external electronic device supports the designated mode, obtaining first additional information related to the external electronic device, and based on the identification that the external electronic device does not support the designated mode, obtaining second additional information related to the external electronic device, and storing at least part of the identification information or the second additional information in a non-volatile memory.

According to various embodiments, the method may further comprise transferring at least part of the identification information or the second additional information from a volatile memory to the non-volatile memory.

According to various embodiments, the method may further comprise, based on the identification that the external electronic device does not support the designated mode, transmitting at least part of the identification information or the second additional information to another external electronic device.

According to various embodiments, the method may further comprise, based on the identification that the external electronic device does not support the designated mode, transmitting at least part of the identification information or the second additional information to another external electronic device.

According to various embodiments, based on the identification that the external electronic device does not support the designated mode, it may be possible to abstain from processing the serial data based on the second additional information.

According to various embodiments, an electronic device may comprise a connector configured to communicate serial data, a non-volatile memory configured to store first identification information about a first external electronic device previously connected via the connector, and a processor, wherein the processor may be configured to obtain second identification information about a second external electronic device currently connected via the connector, activate at least some functions of the second external electronic device based on, at least, determining that the second identification information corresponds to the first identification information, and deactivate the at least some functions of the second external electronic device based on, at least, determining that the second identification information does not correspond to the first identification information.

According to various embodiments, the electronic device may further comprise a communication interface, and the processor may be configured to, based on the identification that the second identification information corresponds to the first identification information, identify whether the designated mode of the serial data is supported by the second external electronic device via the connector, obtain additional information related to the second external electronic device based on, at least, whether the designated mode is supported or not, and transmit at least part of the obtained second identification information or the additional information to a third external electronic device by using the communication interface.

According to various embodiments, the electronic device may further comprise an identification module configured to identify the external electronic device, and the non-volatile memory may be configured as at least part of the identification module.

According to various embodiments, the processor may include an application processor, and the non-volatile memory may be configured as at least part of a memory controlled by the application processor.

According to various embodiments, the processor may be configured to obtain installation information corresponding to the second external electronic device from the third external electronic device by using the communication interface.

According to various embodiments, an electronic device may have the operation of storing first identification information about a first external electronic device previously connected with the electronic device, the operation of obtaining second identification information about a second external electronic device currently connected with the electronic device, the operation of activating at least some functions of the second external electronic device based on, at least, determining that the second identification information corresponds to the first identification information, and the operation of deactivating the at least some functions of the second external electronic device based on, at least, determining that the second identification information does not correspond to the first identification information.

According to various embodiments, the electronic device may further have, based on the identification that the second identification information corresponds to the first identification information, the operation of identifying whether a designated mode of the serial data is supported by the second external electronic device via the connector, the operation of obtaining additional information related to the second external electronic device based on, at least, whether the designated mode is supported or not, and the operation of transmitting at least part of the obtained second identification information or the additional information to a third external electronic device by using the communication interface.

According to various embodiments, the electronic device may further have the operation of obtaining installation information corresponding to the second external electronic device from the third external electronic device.

The invention claimed is:

1. An electronic device, comprising:
   a connector comprising Universal Serial Bus (USB) port including a plurality of pins configured to communicate serial data to an external electronic device;
   a non-volatile memory; and
   a processor configured to:
   obtain identification information of the external electronic device through the connector;
   identify whether the external electronic device supports a designated mode based on, at least, the identification information;
   based on the identification that the external electronic device supports the designated mode, obtain first additional information related to the external electronic device using a first pin from among the plurality of pins;
   based on the identification that the external electronic device does not support the designated mode, obtain second additional information related to the external electronic device using a second pin from among the plurality of pins; and
   store at least part of the identification information or the second additional information in the non-volatile memory.

2. The electronic device of claim 1, further comprising an identification module configured to identify the external electronic device, wherein the non-volatile memory is configured as at least part of the identification module.

3. The electronic device of claim 1, wherein the processor includes an application processor, and wherein the nonvolatile memory is configured as at least part of a memory controlled by the application processor.

4. The electronic device of claim 3, further comprising an identification module configured to identify the external electronic device, wherein the identification module is configured to transfer at least part of the identification information or the second additional information from the non-volatile memory constituting at least part of the identification module to the non-volatile memory.

5. The electronic device of claim 1, further comprising a communication interface, wherein
based on the identification that the designated mode is not supported, the processor is configured to transmit at least part of the identification information or the second additional information to another external electronic device using the communication interface.

6. The electronic device of claim 5, wherein the processor is configured to obtain installation information corresponding to the external electronic device from the other external electronic device using the communication interface in response to transmission.

7. A method for controlling an electronic device, the method comprising:
obtaining identification information of an external electronic device which is connected the electronic device through Universal Serial Bus (USB) port including a plurality of pins;
identifying whether the external electronic device supports a designated mode based on, at least, the identification information;
based on the identification that the external electronic device supports the designated mode, obtaining first additional information related to the external electronic device using a first pin from among the plurality of pins;
based on the identification that the external electronic device does not support the designated mode, obtaining second additional information related to the external electronic device using a second pin from among the plurality of pins; and
storing at least part of the identification information or the second additional information in a non-volatile memory.

8. The method of claim 7, further comprising transferring at least part of the identification information or the second additional information from a volatile memory to the non-volatile memory.

9. The method of claim 7, further comprising, based on the identification that the external electronic device does not support the designated mode, transmitting at least part of the identification information or the second additional information to another external electronic device.

10. The method of claim 9, further comprising obtaining installation information corresponding to the external electronic device from the other external electronic device.

11. The method of claim 7, further comprising, based on the identification that the external electronic device does not support the designated mode, abstaining from processing serial data based on the second additional information.

12. An electronic device, comprising:
a connector comprising Universal Serial Bus (USB) port including a plurality of pins configured to communicate serial data;
a non-volatile memory configured to store first identification information about a first external electronic device previously connected via the connector; and
a processor, wherein the processor is configured to:
obtain second identification information about a second external electronic device currently connected via the connector,
activate at least some functions of the second external electronic device based on, at least, determining that the second identification information corresponds to the first identification information, and
deactivate the at least some functions of the second external electronic device based on, at least, determining that the second identification information does not correspond to the first identification information
wherein the processor is further configured to:
identify whether a designated mode of the serial data is supported from the second external electronic device via the connector when the second identification information corresponds to the first identification information,
if the designated mode of the serial data is supported, obtain first additional information related to the second external electronic device using a first pin from among the plurality of pins;
if the designated mode of the serial data is not supported, obtain second additional information related to the second external electronic device using a second pin from among the plurality of pins; and
storing at least part of the first additional information or the second additional information in the non-volatile memory.

13. The electronic device of claim 12, wherein the processor is further configured to transmit at least part of the obtained second identification information or the second additional information to a third external electronic device using a communication interface.

14. The electronic device of claim 12, further comprising an identification module configured to identify the first external electronic device or the second external electronic device, wherein the non-volatile memory is configured as at least part of the identification module.

15. The electronic device of claim 12, wherein the processor includes an application processor, and wherein the non-volatile memory is configured as at least part of a memory controlled by the application processor.

16. The electronic device of claim 1, wherein the designated mode is an USB alternate mode.

17. The electronic device of claim 1, wherein the first additional information comprises vendor identification (VID) information related to the external electronic device.

18. The electronic device of claim 1, wherein the second additional information comprises billboard descriptor information related to the external electronic device.

19. The electronic device of claim 12, wherein the designated mode is an USB alternate mode.

20. The electronic device of claim 12, wherein the first additional information comprises vendor identification (VID) information related to the external electronic device, and wherein the second additional information comprises billboard descriptor information related to the external electronic device.

* * * * *